United States Patent [19]

Noguchi

[11] Patent Number: 4,486,201

[45] Date of Patent: Dec. 4, 1984

[54] METHOD AND APPARATUS FOR FILTERING GASES CONTAINING FINE PARTICLES AND CLEANING A FILTER CLOTH OF COLLECTED PARTICLES

[75] Inventor: Haruo Noguchi, Yokohama, Japan

[73] Assignee: Colortronic Co., Ltd., Tokyo, Japan

[21] Appl. No.: 437,684

[22] Filed: Oct. 29, 1982

[30] Foreign Application Priority Data

Oct. 30, 1981 [JP] Japan .................... 56-172948

[51] Int. Cl.³ ............................. B01D 46/04
[52] U.S. Cl. .......................... 55/96; 55/302
[58] Field of Search ............ 55/96, 291, 293, 301, 55/302, 498

[56] References Cited

U.S. PATENT DOCUMENTS

| | | | |
|---|---|---|---|
| 3,095,289 | 6/1963 | Egan | 55/96 |
| 3,471,024 | 10/1969 | Doucet | 55/96 |
| 3,816,977 | 6/1974 | Gordon et al. | 55/302 |
| 3,884,657 | 5/1975 | Rebours et al. | 55/293 |
| 4,007,026 | 2/1977 | Groh | 55/498 |
| 4,082,523 | 4/1978 | Pausch | 55/293 |
| 4,306,888 | 12/1981 | Cheng | 55/96 |

FOREIGN PATENT DOCUMENTS

2146746 3/1973 Fed. Rep. of Germany .
992290 5/1965 United Kingdom .................. 55/302
2060433 5/1981 United Kingdom .

Primary Examiner—David L. Lacey
Attorney, Agent, or Firm—Staas & Halsey

[57] ABSTRACT

A filter cake cleaning method in a process for filtering gases containing fine particles, as well as a device for practicing the filter cake cleaning method. A filter cake adhering to a filter cloth is cleaned off by passing an overall amplified high-speed gas flow along the primary or outer side of the filter cloth parallel to the filter cloth surface on which the filter cake forms, the surface serving as the wall of a gas passage. A device emits a jetted stream into a collecting vessel at an open space upstream of a gas passage for entraining gas existing in the collecting vessel and for forming the overall amplified high pressure gas, and is controlled by a single automatic open/close valve. A device provided on the secondary or inner side of the filter cloth for jetting backwashing air can be used in conjunction with the above cleaning operation to enhance the cleaning effect.

17 Claims, 8 Drawing Figures

METHOD AND APPARATUS FOR FILTERING GASES CONTAINING FINE PARTICLES AND CLEANING A FILTER CLOTH OF COLLECTED PARTICLES

BACKGROUND OF THE INVENTION

This invention relates to a method of filtering a gas containing fine particles by means of a filter, and to a filtration apparatus for practicing the method.

Various methods of filtration are known in the art for completing removing fine particles from a gas to fully recover the particles and clean the gas. Such methods rely upon an electrostatic Cottrell precipitator or an absorption tower which uses a liquid-based system, but the simplest and most reliable method in wide use is to perform filtration by means of a filtration apparatus having a filter consisting of a filter cloth. A typical example of such a filtration apparatus has a plurality of the filters, each in the form of a cylinder, so arranged as to depend vertically from the ceiling plate of a collecting vessel. The contaminated gas is caused to pass through each cylindrical filter from the outer to the inner side thereof, whereby the particulate matter contained in the gas is removed. The cleaned gas then exits from the apparatus through passages penetrating the ceiling plate above respective ones of the cylindrical filters.

The filter cloth used in the aforementioned filters may be broadly classified into two types. The first is a thick unwoven fabric having an extremely coarse texture and a thickness of from 15 to 30 mm, and the second also is an unwoven fabric having a fine surface and a thickness of from 1 to 2 mm.

With the first filter cloth, particulate matter such as dust contained in the gas (which we will hereinafter assume to be air for the purpose of description) is caused to lodge within the filter texture thereby to be absorbed within the walls of the filter. The purpose of this filter is to incompletely collect the dust contained in the air stream only at a low concentration. Thus the particulate matter is removed imperfectly and cannot be reutilized.

The second filter cloth, on the other hand, does not ordinarily have a pore diameter as small as the particle diameter of the particles that are desired to be collected. Specifically, the mean pore diameter in many cases ranges from 5 to 20 microns. Filtration of this kind belongs to the category of so-called cake filtration. Specifically, using a filter cloth of a pore diameter greater than the particle diameter of the particulate matter, a very minute proportion of the particulate matter passes completely through to the secondary side (inner side) of the filter cloth at the instant filtration begins, but immediately thereafter the particulate matter forms a layer, known as a filter cake, on the primary or outer surface of the filter cloth. The filter cake itself then begins acting as a filter to thenceforth enable complete collection of the particles.

The cake filtration method using the second filter cloth is beset by a number of problems when filtration is conducted at a high rate. With a high rate of filtration, the concommitant wind pressure causes the particles in the filter cake to penetrate through the pores in the filter cloth and emerge from the secondary side. This is referred to as so-called filtering break-through, making it impossible to achieve full collection of the particles. The high wind pressure also drives the particles deeply into the filter cloth texture, clogging the pores so that recovery by means of shaking or backwashing cannot be achieved with satisfactory results.

Owing to the aforementioned problems, the flow velocity through the second filter cloth that is adopted for particle collection is ordinarily from 1 to 2 m/min (1.67 to 3.33 cm/sec). This is much lower than the flow velocity of 1 to 2 m/sec that can be realized with the first filter cloth. Accordingly, for a constant air flow rate, it is required that the second filter cloth have a very large area to assure proper operation. However, for certain particulate matter which is easy to deal with, depending upon such factors as the particle diameter and adherability, a flow velocity of up to 6 m/min (10 cm/sec) can be achieved.

There are other reasons for requiring the very low filtration flow speed mentioned above. For instance, a high flow velocity and small filter area causes an abrupt rise in the pressure differential across the wall of the filter cloth owing to its fine texture. Also, a high flow velocity makes it difficult to collect the particles fully and to recover dust following removal.

When filtration is carried out with a filtration apparatus that relies upon the filter cloth of the second type, the particles extracted from the air form a filter cake by attaching to and accumulating on the upstream side (namely the primary or outer side mentioned above, the opposite or downstream side being the secondary or inner side) of the filter cloth with the passage of time. The formation of the filter cake causes the pressure differential, measured across the primary to the secondary sides, to rise. Since an excessive rise in the pressure differential would be undesirable in terms of the inherent limitations upon the facilities that provide the air supply pressure and in terms of a deterioration in filter performance, it is required that the filter cake be removed from the filter cloth. It is also required that the particulate matter be recovered. For these reasons, it is general practice to provide a so-called dust removal mechanism for knocking the filter cake off the filter cloth automatically at such time that the filter cake attains a certain thickness.

Two conventional techniques are available for effecting such dust removal. One is a so-called shaking method wherein the filter cloth is vibrated mechanically to shake off the filter cake. The other is a so-called backwashing method wherein pressurized air is momentarily blown down toward the second side of the filter, that is, from the inner side thereof, to dislodge the accumulated particles from the primary side of the filter by means of the reverse air flow. This latter method is gaining wider popularity owing to its simpler construction.

Before continuing, it should be noted that a filtration apparatus with a somewhat different structure also is available, wherein a number of longitudinally extending bags consisting of filter cloth are provided perpendicular to the walls of the collecting vessel. However, in terms of the overall construction and dust removal technique, this apparatus is essentially no different from that described above.

Generally speaking, in a case where particles have a particle diameter of as large as 10 microns, there is little adhesion among the particles and between the particles and the surface of the filter cloth. For particles of this size, therefore, the filter cake can be dislodged with just slight vibration, irrespective of whether the shaking or backwashing method is employed, and the filtration apparatus may operate without difficulty. For finely divided powders such as pigment power most of whose particle diameters are less than one micron, or carbon black having a particle diameter generally in the millimicron class, the particles exhibit a high physicochemical attraction as well as a high degree of cross-linking which occurs when the particles are irregular in shape, rather than circular. The end result is that the particles have a greater tendency to adhere to one another and to the surface of the cloth filter, making it difficult to dislodge them from the filter. Such particles will be referred to as adherent particles hereafter.

Let us consider the filtration process with respect to such adherent particles. At the early stages of filtration, the filter cake is capable of being dislodged from a comparatively large region of the filter cloth by backwashing. As the filtration and backwashing cycles are repeated, however, the area of the filter cloth from which adherent particles are removed grows rapidly smaller until the filter cake is no longer capable of being dislodged from virtually any part of the filter. This makes a continuously running operation impossible. The cause of this phenomenon is presumed to be that since the wind pressure which acts upon the overall filter cloth area during backwashing is so small, the influence of internal pressure upon the overall filter cloth is almost nil, with the wind employed in the backwashing operation exiting from the primary or outer side of the filter cloth solely from those points offering least resistance. It is from these points alone that the filter cake falls away. As the next filtration cycle proceeds, the flow of contaminated air concentrates at these relatively exposed areas of the filter cloth, from which time onward filtration takes place primarily at these points at a rate much higher than that designed for originally. These occurrences allow the filter cake to harden and cause partial blockage or clogging of the filter cloth pores so that, when the next backwashing cycle takes place, the affected areas of the filter experience almost no air flowing backwardly across the cloth. This, coupled with the hardening of the cake, appears to account for the failure of the dust removal operation. In short, it seems that if dust removal is allowed to take place only in part, then the area of the filter cloth that can be used effectively diminishes until the flow velocity through the filter is no longer true to the proper filtration flow velocity selected when the filtration apparatus was designed. As a result, the filter cake clinging to the filter cloth hardens and grows, gradually diminishing the circulation of air through the filter.

In a case where backwashing is employed to dislodge the filter cake attached to the filter cloth, an outlet pipe through which clean air exits from the filtration apparatus employs flow velocities of from 1 to 3 m/sec for liquids and from 20 to 30 m/sec for gases, which are appropriate for ordinary fluid transport in terms of economy and space limitations. However, when a comparison is made between the outlet pipe flow velocity (say 20 m/sec) and the filtration flow velocity (say 3 cm/sec), it may be understood that the area ratio of the filter cloth to the cross-sectional area of the outlet pipe passage is 2000/3, namely that the filter cloth has 667 times the cross-sectional area of the pipe passage. Moreover, the reversely directed stream of air jetted during the brief backwashing cycle emerges from a backwashing orifice of a diameter smaller than that of the outlet pipe, so that the jetted air stream does not have a flow velocity much different from the flow velocity of the air passing through the outlet pipe. This, coupled with the fact that the filter has a very fine texture, causes the air stream jetted during backwashing to be sealed off so that the air stream can neither flow the length of the cylindrical filter nor pass through the filter cloth from the jetted side. Instead, the air stream acts upon substantially the entire surface area of the filter cloth and develops a flow velocity near that of the abovementioned filtration flow velocity. Consequently, the jetted air stream cannot free the filter cake from the filter cloth, with the result that the pores of the cloth become clogged. A continuously running operation cannot take place unless the filter cloth is cleaned by manually removing the filter cake. Prior efforts at a solution to this problem have resulted in a much larger, complicated and expensive apparatus, for whatever improvement in performance has been achieved.

SUMMARY OF THE INVENTION

Accordingly, an object of the present invention is to provide a method of filtering a gas containing fine particles or powder, through which all varieties of fine particles and powders can be collected completely and a filter cake clinging to a filter cloth can be dislodged from the cloth automatically.

Another object of the present invention is to provide a method of filtering a gas containing fine particles and powders, wherein the gas to be filtered is passed through a filter cloth at a low speed and a filter cake formed by particles attached to the filter cloth is cleaned off by an overall amplified cleaning gas flow passing along the primary side of the filter cloth, which gas flow is formed by a high-speed pressurized air stream jetted by opening and closing a valve.

Still another object of the present invention is to provide a method of filtering a gas containing fine particles and powders, wherein the flow rate of air introduced externally to single filter cloth during cleaning is held equal to or about twice that of the normal filtration flow rate of a single filter cloth, and wherein the entire filter cake on the filter cloth is placed within the region of the overall amplified cleaning gas flow at the instant of cleaning, whereby the filter cake may be freed and lifted away from the filter cloth in its entirety.

Yet another object of the present invention is to provide a structurally simple filtration apparatus for practicing the foregoing method of the invention.

Another object of the present invention is to provide a method of filtering a gas containing fine particles and powders, wherein when, an overall amplified cleaning gas flow acts upon the primary side of a filter cloth, pressurized air is jetted from a backwashing air orifice disposed in an outlet pipe to enhance the effect of cleaning a filter cake off the filter cloth.

Another object of the present invention is to provide a structurally simple filtration apparatus for practicing the foregoing method of the invention.

A further object of the present invention is to provide an apparatus for filtering a gas containing fine particles or powders adapted so that an overall amplified cleaning gas flow, created by a high-speed gas stream jetted from an orifice passes between the fluted portions of a fluted filter cloth.

Still another object of the present invention is to provide a filtration apparatus adapted so that an overall amplified cleaning gas flow passes between filter cloths disposed in parallel.

Other features and advantages of the present invention will be apparent from the following description taken in connection with the accompanying drawings.

DESCRIPTION OF THE PREFERRED EMBODIMENT

To gain a better understanding of the present invention, a brief discussion of typical prior art will be presented first for the purpose of comparison.

Figure 1:
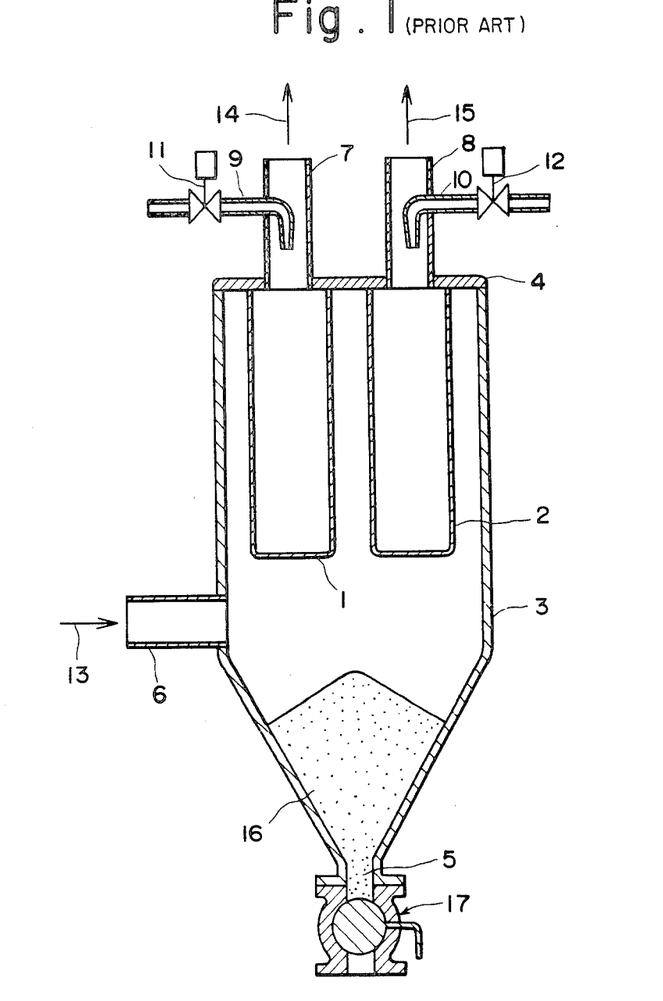
FIG. 1 is a sectional view illustrating a filtration apparatus and collecting vessel used in practicing a conventional backwashing method.

Referring to FIG. 1 which illustrates a filtration apparatus and collecting vessel for backwashing according to the prior art, two cylindrically-shaped filter cloths 1, 2 are shown for describing the operating principal, although a number of such filter cloths are provided in actual practice. The collecting vessel, designated by numeral 3, has a ceiling plate 4 from which the filter cloths 1, 2 depend vertically, an outlet 5 for the collected fine particles or powder, and a pipe 6 for supplying the contaminated air which is to be filtered. Outlet pipes 7, 8 for the filtered clean air extend from the ceiling plate 4. The outlet pipes 7, 8 are penetrated by respective conduits 9, 10 each of which communicates with a source of pressurized air, not shown. Automatic valves 11, 12 are provided in the flow passages of the respective conduits 9, 10 for opening and closing these passages to the source of pressurized air. The arrow indicated at 13 shows the direction of contaminated air flow as it enters the apparatus, while the arrows at 14, 15 show the direction of the cleaned air flow exiting from the apparatus. Numeral 16 denotes the fine particles or powder collected at the bottom of the vessel 3, where a discharge value 17 is provided for discharging the collected particles.

In terms of air flow, the air contaminated with the particulate matter is fed in continuously from the supply pipe 6. The major portion of the particulate matter is separated from the air flow by the influence of gravity and settles at the bottom of the vessel 3 for collection. The separating effect of gravity may be enhanced greatly by disposing the supply pipe 6 along a line which is tangent to the cylindrical wall of the collecting vessel 3. Since the valve 17 is closed, the air accompanied by the remaining free particles passes through the cylindrical filter cloths 1, 2 from the outer (primary) to the inner (secondary) sides thereof and then is discharged from the outlet pipes 7, 8 as clean air completely removed of particulate matter. During the course of this filtration cycle, the particles attach themselves to the outer surfaces of the filter cloths 1, 2 to be collected thereby. After a certain period of time, one of the filter cloths, say cloth 1, is subjected to a backwashing operation. This entails expelling a momentary jet of pressurized air for backwashing from the conduit 9. The purpose of this step is to blow off the particulate matter from the filter cloth 1 by the reverse flow of backwashing air travelling from the secondary side to the primary side of the filter cloth. During the backwashing cycle of operation, jetted air which passes completely through the filter cloth 1 and exits from the primary (outer) side thereof is excess air that proceeds to flow through the filter cloth 2 in the normal direction (i.e., primary to secondary side) and then out through the outlet pipe 8. As this is taking place, there is a corresponding increase in the load acting upon the filter cloth 2, which at this time is not being subjected to backwashing. For this reason, a number of the filter cloths generally are provided, as mentioned above, and the method followed is to successively backwash the filter cloths in small groups, thereby diminishing the rate of increase in load.

Let us now split the above process into the filtration and backwashing cycles and consider these in quantitative terms. We will take the filtration cycle first.

The apparatus of FIG. 1 is designed for a flow rate of 3 $m^3$/min (50,000 $cm^3$/sec) with regard to the contaminated air being continuously fed into the collecting vessel. Since the flow rate processed per cloth filter will be 25,000 $cm^3$/sec, each of the cloth filters will require a large surface area of 25,000/3.33 = 7,500 $cm^2$ (0.75 $m^2$) where the filtration flow velocity is 3.33 cm/sec. By comparison, a suitable cross-sectional area for the flow passage through the outlet pipe 7 or 8 is a small 25,000/2000 = 12.5 $cm^2$ for a flow velocity of 20 m/sec (2000 cm/sec). For a hollow circular pipe, this is an inner diameter of 4.0 cm. In designing the outer geometry of a filter cloth, the cylindrical shape is often adopted because of structural simplicity. In such case, the surface area obtained would be 7,500 $cm^2$ for a cylinder having a diameter (D) of 20 cm and a length (L) of 119 cm. The result is a slender filter in which L/D=6. In order to increase the filtering surface area relative to the diameter of the collecting vessel 3, it is necessary to enlarge L/D and insert a number of the filter cloths into the vessel. In this connection, increasing the diameter (D) of the filter cloth would make it impossible to accommodate a large number of them in the vessel. It is inevitable, therefore, that the filter cloth configuration will be long and slender since the conventional method demands that L/D be large.

With regard to the backwashing cycle of operation, the pressurized air is expelled from the conduit 9 for a very short period of time of, say, 0.2 sec. To this end, an arrangement is required wherein the automatic valve 11 located upstream of the conduit 9 is rapidly opened for the time required, and then closed. Introducing the pressurized air for a long period of time is undesirable since it would send a large quantity of air into the collecting vessel 3 on the primary side of the filter cloth, adding to the air entering from the supply pipe 6 for the purpose of being treated. Furthermore, the short burst of backwashing air, with as low a flow rate as possible, is preferred in order to reduce pressurized air consumption. The initial flow velocity of the pressurized air itself when jetted from the conduit 9 can attain a high speed approaching that of sound if the air pressure upstream of the conduit is two atmospheres (absolute) or more. Owing to this kinetic energy, an ejector effect is produced within the outlet pipe 7, whereby the excess air is made to join the expelled air to form an increased flow of air which exits from the primary side of the cloth filter via the secondary side thereof. However, because of various limiting conditions set forth hereinbelow, the total air flow rate in the reverse direction for the purpose of backwashing is limited to approximately the filtration flow rate (25,000 cm$^3$/sec in this example) or, at best, to a value which is two to three times this figure. The reasons are as follows:

(a) The outlet pipe 7 proper is designed for the normal filtration flow rate. The reason forbidding a large increase in the size thereof is set forth in (d) below.

(b) As mentoned earlier, it is necessary to provide a number of the filter cloths in common practice. The number of such filter cloths required will be quite large if the ratio of total air flow rate during backwashing to the normal flow rate is increased to a marked degree. For example, if the flow rate of air introduced backwardly through one filter cloth in a backwashing operation is ten times normal, then the filtration flow rate for air passing through the other filter cloths in the normal direction at the instant of backwashing will increase by 6.5 times for a total of three filter cloths, and 2.2 times for ten filter cloths. Thus, in order to increase the ratio of the total air flow rate during backwashing to the normal rate in an effort to enhance the dust removal effect, the only expedient is to increase the number of filter cloths which, in turn, means increasing the number of outlet pipes. This leads to a major drawback, however, as will be mentioned below.

(c) The automatic valve for controlling the pressurized air is required to have an instantaneous open-close characteristic. While a satisfactory characteristic can be obtained with a small-size electromagnetic or solenoid valve, it is not possible to achieve such a characteristic with a valve having a large opening diameter using an inexpensive solenoid valve. Instead, obtaining the desired valve raises costs, complicates the apparatus and increases its size. This problem is compounded by the fact that an automatic valve for controlling the pressurized air must be installed for each filter cloth and outlet pipe combination, of which the total number is large.

(d) When a large number of outlet pipes are provided, the piping for supplying the pressurized air to each one becomes quite complicated in actual practice. Since the spacing among the filter cloths is narrowed in order to minimize the overall size of the apparatus, sufficient space for piping is not available in the area above the apparatus. As the number of filter cloths is increased, moreover, even less space is available for the automatic valves that control the pressurized air and for the piping (namely for supplying the pressurized air and for withdrawing the cleaned air).

Thus, as set forth above, it may seem possible in theory to markedly increase the ratio of the total air flow rate for backwashing to the normal air flow rate, but the higher costs and increased facility size actually prohibit this from being achieved. With the outlet pipe 7 shown in the arrangement of FIG. 1, the usual high flow velocity for the transport of a gas through a tube is achieved, specifically a flow velocity of 20 m/sec at normal filtration and of 40 to 60 m/sec for flow in the reverse direction during backwashing. Since the filter area is some 600 times greater than the cross-sectional area of the flow passage of the outlet pipe 7, however, the major problem encountered here is that the flow velocity of the air passing through the filter in the reverse direction during backwashing is only $3.33 \times 2 = 6.66$ cm/sec to $3.33 \times 3 = 10$ cm/sec at most. This is an extremely low or even gentle wind speed on a par with that which prevails during normal filtration, and does not afford the strong wind effect needed to uniformly scatter the filter cake of adherent particles from the entire surface of the filter.

A brief discussion of what is meant by a strong wind will be instructive. When pneumatically conveying particles having a particle diameter of less than 3 to 4 mm, the air flow velocity through a pipe usually adopted to avoid settlement and blockage is 10 to 25 m/sec for a circular pipe having an opening diameter of from one to six inches. This flow velocity is known as the so-called critical velocity. At a flow velocity of 20 m/sec, problem-free pneumatic transport of particles is perfectly feasible even with respect to the adherent particles dealt with in the present invention, except for special cases where the particles may be affected by dampness or the like. At such an air flow velocity, the particles will not adhere to and build up on the walls of the pipe. In other words, rather than clinging to the pipe walls, the particles are blown off the walls. This condition, unbalanced in favor of the latter state, is maintained continuously. Thus, a strong wind is that representative of a wind velocity that will not allow particles to adhere to the walls of a pipe.

Let us now suppose that the abovementioned flow velocity of 20 m/sec is adopted for backwashing the filter cloth shown in FIG. 1. Since the area of the filter cloth is 7,500 cm$^2$, the quantity of air will be $7,500 \times 2,000 = 15 \times 10^6$ cm$^3$/sec. Hence, the flow velocity within the outlet pipe (having a passage cross-sectional area of 12.5 cm$^2$) would have to be 12,000 m/sec, and even the flow velocity of air directly downwardly through the filter cloth cylinder (diameter 20 cm, cross-sectional area = 314 cm$^2$, perpendicular to the cylinder axis) would have to be 477 m/sec. Since these are values greatly exceeding the speed of sound, which is the upper limit on gas flow velocity, it may be understood that such speeds are theoretically impossible. Moreover, the quantity of air would be 600 ($15 \times 10^6/25,000$) times that prevailing during normal filtration. This also is a figure that would be impossible to achieve in view of the technical problems set forth above.

Figure 2:
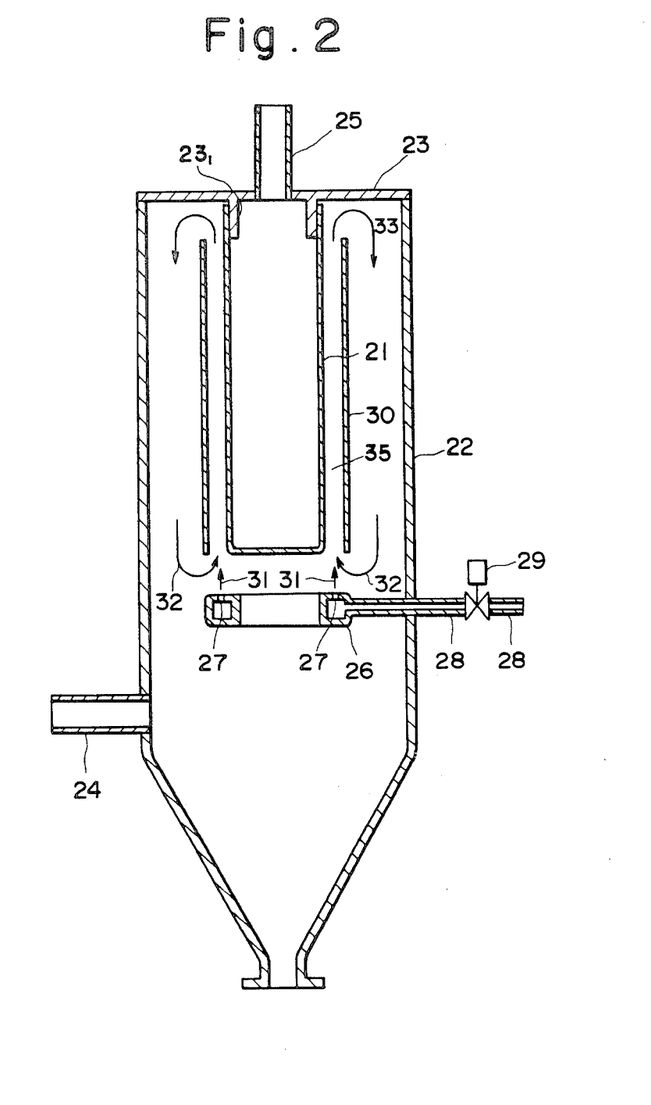
FIG. 2 is a sectional view useful in describing the filtering method of the present invention.

The filtering method of the present invention, which may be understood from FIG. 2, is hereinafter referred to as a booster (or amplification) fluidization cleaning process or BFC, process. The apparatus for practicing this process is hereinafter referred to as a BFC filtration apparatus.

Referring to FIG. 2, the apparatus includes a filter cloth 21, a collecting vessel 22, a ceiling plate 23 provided on the collecting vessel, a supply pipe 24 for leading contaminated air into the collecting vessel, an outlet pipe 25 penetrating the ceiling plate for discharging cleaned air, and pressurized air delivery piping 26 communicating with a pressurized air supply pipe 28. The top side of the pressurized air delivery piping 26 is provided with a multiplicity of jet orifices 27 positioned in an open space in the vessel 22 upstream of a gas passage 35 as will be described below. An automatic valve 29 is provided in the supply pipe 28 to open and close the pipe to the pressurized air. A sleeve-shaped guide plate 30 is disposed to surround the filter cloth 21 so as to delimit the passage 35 defined between itself and the filter, the guide plate 30 being supported from the ceiling plate 23 in the illustrated position by a small number of appropriate support means, not shown. The arrows shown at 31 indicate the direction in which the pressurized air is jetted from the orifices 27. Arrows shown at 32 indicate the direction in which air circulates within the collecting vessel 22 owing to the ejector or entrainment effect accompanying the pressurized air jetted as shown by the arrows 32. Arrows 33 indicate the direction in which the combined air streams 31, 32 (referred to hereinafter as an overall amplified cleaning gas flow) are discharged, together with the filter cake, from the passage between the filter cloth 21 and guide plate 30, the combined air streams exiting back into the collecting vessel 22 from the top of said passage. It should be noted that only one filter cloth is shown in order to simplify the drawing.

The filter cloth 21 is affixed along the inner edge of its open upper end to a flange $23_1$ projecting downwardly from the bottom side of the ceiling plate 23. Although the filter cloth 21 is cylindrically shaped in FIG. 2, any desired shape may be adopted. Accordingly, the guide plate 30 surrounding the outside of the filter cloth 21 is similarly shaped in order that the overall amplified cleaning gas may flow through the passage 35 in a uniform manner. Thus the portion of the filter cloth 21 that is parallel to the guide plate 30 is represented as a cylinder.

In order that the overall amplified cleaning gas developed by the air jetted from the orifices 27 may flow uniformly into the passage 35 between the filter cloth 21 and guide plate 30, the pressurized air supply pipe 28 is supported on the collection vessel 22 and passed, through the wall thereof in such fashion as to position the orifices 27 in the open space just upstream from the passage opening.

Let us now describe a filtering cycle of operation, followed by a description of a cleaning cycle. Quantitatively, we will assume that the filter cloth 21 has dimensions the same as those described in connection with FIG. 1, and that the filtration air flow rate per filter also is the same.

As for the filtration cycle, the contaminated air enters from pipe 24 and reaches the surface of the filter cloth 21 after flowing into the passage 35 between the filter cloth and the guide plate 30 from the upper and lower ends thereof. In all other aspects the filtration cycle is as described earlier with reference to FIG. 1.

The cleaning cycle will now be described quantitatively, with emphasis being placed upon the removal of the filter cake. In the cleaning operation, the automatic valve 29 is opened momentarily, for a period of from 0.2 to 0.3 sec, and then closed. As a result, a predetermined air pressure, preferably of 2 atm (absolute) or more, is applied upstream of the orifices 27, causing pressurized air to be jetted from the orifices 27 in the direction of the arrows 31 at a velocity equal to or near the speed of sound. We will assume that the flow rate of the pressurized air is the same as the filtration flow rate, namely 25,000 $cm^3$/sec under atmospheric conditions following the ejection of the pressurized air. Since the air travelling at this flow rate possesses great kinetic energy owing to the sonic speed involved, an amount of existing air in the collecting vessel 22 a number of times greater than that jetted from the orifices 27 drawn pneumatically from the area or open space below the filter cloth 21 and is forced upwardly through the passage 35 between the filter 21 and the guide plate 30. Though this results in an overall cleaning air flow rate amplified tens of times from the flow rate of the jetted air from orifices 27. This increase or amlification in the flow rate is not due to air brought in from the outside but results from the air inside the collecting vessel 22 on the primary (outer) side of the filter cloth 21. Hence, it is not required that an amount of air corresponding to the increased flow rate be discharged or purged from the system. Thus, one characterizing feature of the present invention resides in the above-described magnifying or amplification action and in the fact that circulation is produced within the system on the primary side of the filter cloth.

The second important feature of the present invention will now be described. In order for the amplified air at the total flow rate for cleaning to be passed substantially parallel to the surface of the cloth filter 21, the air is caused to flow longitudinally of the cloth filter. When this is done, the cross-sectional area of the cleaning air passage 35 can be made very small. Then, if the total air flow rate as magnified above is available, the prescribed flow velocity of 20 m/sec can be obtained with facility. It should be noted that the passage 35, which has the primary (outer) surface of the filter cloth 21 as one wall thereof, is provided for the purpose of causing the air to flow in a direction parallel to the surface of the primary side of the filter, so that no air passes through the filter in a direction perpendicular thereto. The passage therefore is substantially parallel to the surface of the primary filter side, and participates in the cleaning of the filter cloth.

When the outer diameter of the filter cloth 21 is 20 cm, the dimensions of the guide plate 30 for obtaining the flow speed of 20 m/sec are computed as shown in the following table:

| | Total Cleaning Air Flow Rate ($cm^3$/sec) | Filter Cloth Outer Diam. (cm) | Cleaning Air Passage Sectional Area ($cm^2$) | Guide Plate Inner Diam. (cm) |
| --- | --- | --- | --- | --- |
| Case 1: Tenfold Magnification | 250,000 | 20 | 125 | 23.6 |
| Case 2: Twentyfold Magnification | 500,000 | 20 | 250 | 26.8 |

The clearance between the filter cloth 21 and guide plate 30 is 1.8 cm in case 1 and 3.4 cm in case 2, both of which are technically appropriate values. During filtration, the contaminated air travelling at the flow rate of 25,000 $cm^3$/sec enters the passage 35 from the top and bottom of the guide plate 30. Accordingly, the flow velocity through the clearance during filtration is 1 m/sec in case 1 and 0.5 m/sec in case 2, both of which are sufficiently low so that there are no problems. In comparison with the overall cloth filter area of 7,500 $cm^2$, the cross-sectional area of the cleaning passage 35 is very small. Even in a case where the pressurized air is jetted from the orifices 27 for a net length of time of 0.2 sec, each point of the surface of the filter cloth is exposed to air corresponding to a length of four meters (20×0.2=4). With the conventional backwashing method, a backwashing flow velocity of only 10 cm/sec at best is obtained at right angles to the filter cloth, so that each point of the filter cloth surface is exposed to nothing more than 2 cm of air movement.

Some preliminary calculations will be made with regard to the amplification factor achieved by the jetting of pressurized air. The amplification factor depends upon the pressure differential of the pressure rise from the ejector inlet to the ejector outlet, and upon the ejector efficiency. As for the value of the pressure differential, the likely components are 100 mm ag at the inlet and outlet of the passage 35 between the filter cloth and guide plate, and 60 mm ag for the pneumatic transport along the filter cloth length of 1.2 m, for a total of 160 mm ag. Since this is probably the largest value attained, it is almost negligible in the ejector calculations. Omitting energy attributed to pressure and position, and letting the initial jetted air velocity be 300 m/sec, the final air velocity be 20 m/sec, and the associated ratio be X, we need consider only the energy attributed to velocity, so that the following equation holds:

$$300^2 \times m + 0^2 \times X \cdot m = 20^2 \times (1+X) \cdot m$$

Here, X represents the weight of air associated with the weight m of the jetted pressurized air. If we assume that m=1, then X will represent the associated ratio. From the above equation, we have:

$$X + 1 = (300/20)^2 = 225$$

$$X = 224.$$

Ordinarily, the ejector efficiency is no less than 20%. However, since even an ejector efficiency of 10% would result in an associated ratio 22 times greater, an associated ratio 20 times greater as used in the foregoing explanation is a reasonable value.

Next, as shown in the following table, Reynolds numbers will be used to check the earlier mentioned fact that wind speeds of 10 or 20 m/sec are in a so-called "strong wind region" in which an excellent particle dispersing or scattering effect can be obtained without difficulty. In compiling the chart, the values of air viscosity and density are those prevailing at 20° C.

| | REYNOLDS NUMBERS | |
|---|---|---|
| | Pipe inner diam. 2.5 cm | Pipe inner diam. 1.5 cm |
| 3.33 cm/sec | 56 | 336 |
| 10 cm/sec | 168 | 1,008 |
| 10 m/sec | 16,800 | 100,800 |
| 20 m/sec | 33,600 | 201,700 |

The Reynolds numbers at 10 to 20 m/sec greatly exceed the boundary value of 2300 between turbulent flow and laminar flow. It should be noted that the backwashing wind speed achieved with the conventional method is on the order to 10 cm/sec, which is much lower than the turbulent flow region, even for a pipe having an inner diameter of 1.5 cm.

Figure 3:
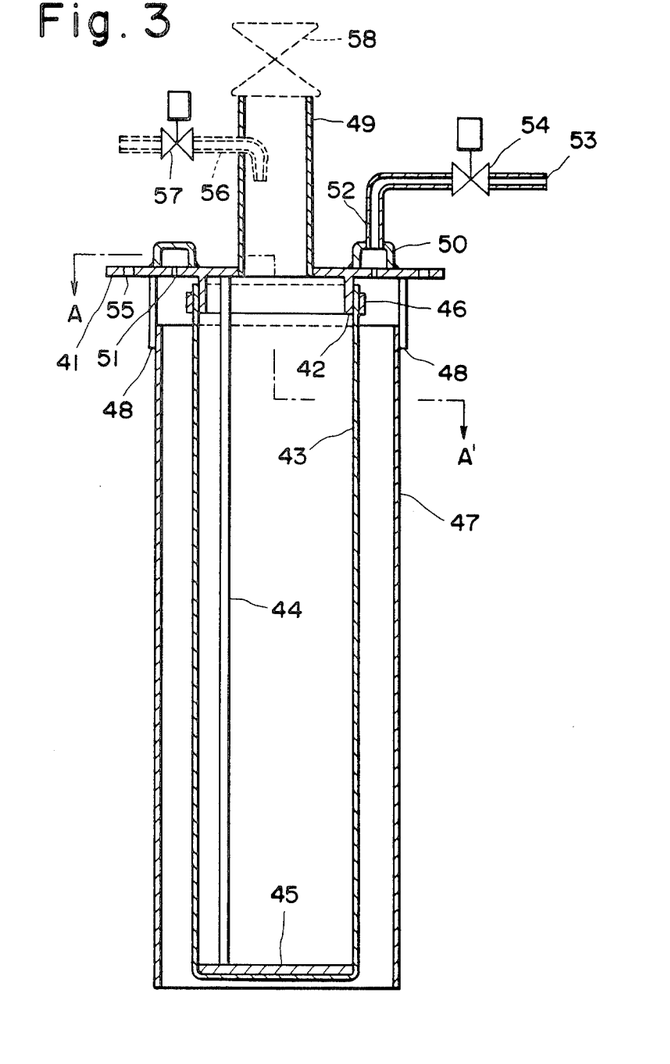
FIGS. 3 and 4 are vertical and horizontal sections, respectively, illustrating an embodiment of a filtration apparatus according to the present invention.
Figure 4:
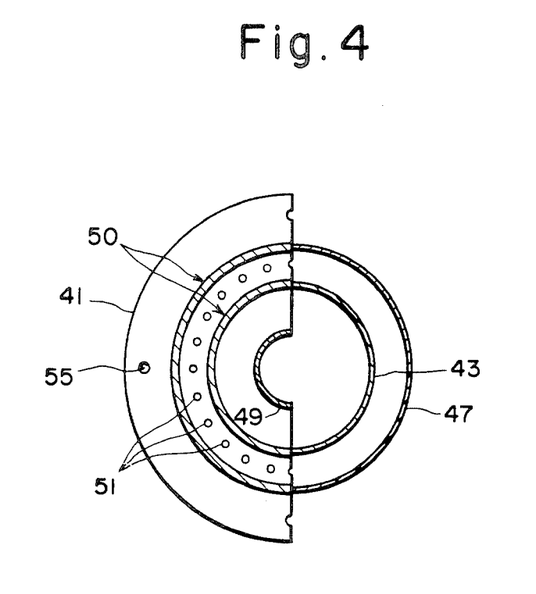

An embodiment of the present invention will now be described with reference to FIGS. 3 and 4, in which FIG. 3 is a vertical section of the filtration apparatus and FIG. 4 a sectional view thereof taken along the line A—A'. The apparatus includes a base plate 41, a filter cloth attaching flange 42 provided on the bottom side of the base plate 41, a cylindrical filter cloth 43, a rod 44 for supporting the filter cloth 43, a plate 45 for supporting the filter cloth, a clamping ring 46 for attaching the upper end of the filter cloth 43 to the flange 42, a guide plate 47 surrounding the filter cloth, and rods 48 for supporting the guide plate 47. An outlet 49 for cleaned air is provided on the base plate 41, and a passage 50 is provided for the jetting of cleaning air. The base plate 41 is provided with orifices 51. A pipe 52 communicates at one end with the passage 50, and at the other end with a cleaning air inlet pipe 53 through an automatic value 54. A conduit 56 for jetting backwashing air penetrates into the outlet pipe 49, with the flow of backwashing air being controlled by an automatic valve 57. The outlet pipe 49 is provided with an automatic cut-off valve 58 for closing off the outlet passage. It should be noted that a collecting vessel, though not shown, is provided in the same manner as depicted in FIG. 2. The collecting vessel also is provided in the other embodiments of the invention, described later, but will likewise be deleted from the drawings.

The filtration apparatus is used by being attached at an opening in the side wall or, preferably, the ceiling plate, of another vessel such as the collecting vessel, with the cylindrical filter cloth 43 being faced toward the inner side of the collecting vessel, and with the base plate 41 being affixed air-tightly to the wall of the collecting vessel by means of bolts passed through bolt holes 55.

The cleaning air inlet pipe 53 is connected to a source of pressurized air under a pressure of, say, 4 to 7 kg/cm$^2$ G. The outlet pipe 49 is opened to the atmosphere directly or through an exhaust duct.

First, with regard to the filtration cycle, air containing fine particles or powder flows from the supply pipe (not shown) into the clearance or passage between the guide plate 47 and cylindrical filter cloth 43 from both ends of the clearance and travels longitudinally along the filter cloth. Then, utilizing the entire surface of the cylindrical filter cloth 43, the air passes through and flows into the filter cloth cylinder and exits from the outlet pipe 49 as clean air. During this filtration cycle, the particles proceed to form a filter cake on the primary-side surface of the filter cloth 43.

In the cleaning cycle of operation, automatic valve 54, which was fully closed during filtration, is opened momentarily and then closed. At such time, compressed air at a pressure of 4 to 7 kg/cm$^2$ G upstream of the automatic valve 54 is supplied for cleaning purposes. The air is fed into the cleaning air jetting passage 50 where the air is jetted downwardly via a number of the orifices 51 into the open space just upstream of the clearance or passage between the guide plate 47 and the outer periphery of the cylindrical filter cloth 43. The overall amplified cleaning air flow is formed and acts as described in connection with FIG. 2, scattering the filter cake clinging to the primary side of the filter cloth 43 and expelling the filter cake into the collecting vessel from the opposite end of the cylindrical filter cloth.

The cleaning mechanism in this embodiment of the invention is augmented by a backwashing effect, provided by momentarily opening the backwashing automatic valve 57 simultaneously with the jetting of the cleaning air, for a period of time substantially equal to the air jetting period. By opening and then closing the valve 57 in this manner, the air from a source of pressurized air connected upstream of the valve 57 is expelled from the backwashing jetting outlet 56 toward the secondary (inner) side of the filter cloth. Thus, according to this embodiment of the invention, the cleaning effect is greatly enhanced. In this embodiment, the instant the valve 57 is opened and the length of time it is left open can be suitably adjusted.

As for the automatic cut-off valve 58 for cutting off the discharge passage of the outlet pipe 49, full closure is effected for a length of time equivalent to the duration of the backwashing operation when backwashing is to supplement the air jetting process. By such full closure of the valve 58, only the air attributed to the pressurized air flow is correctly and forcibly expelled into the collecting vessel, thereby serving to prevent the inflow of excess air from outside the system.

In the embodiments that follow, the backwashing air jetting outlet 56, backwashing automatic valve 57 and the discharge passage automatic cut-off valve 58 are disposed and operate in the manner described as set forth in the above embodiment and are not described again.

Figure 5:
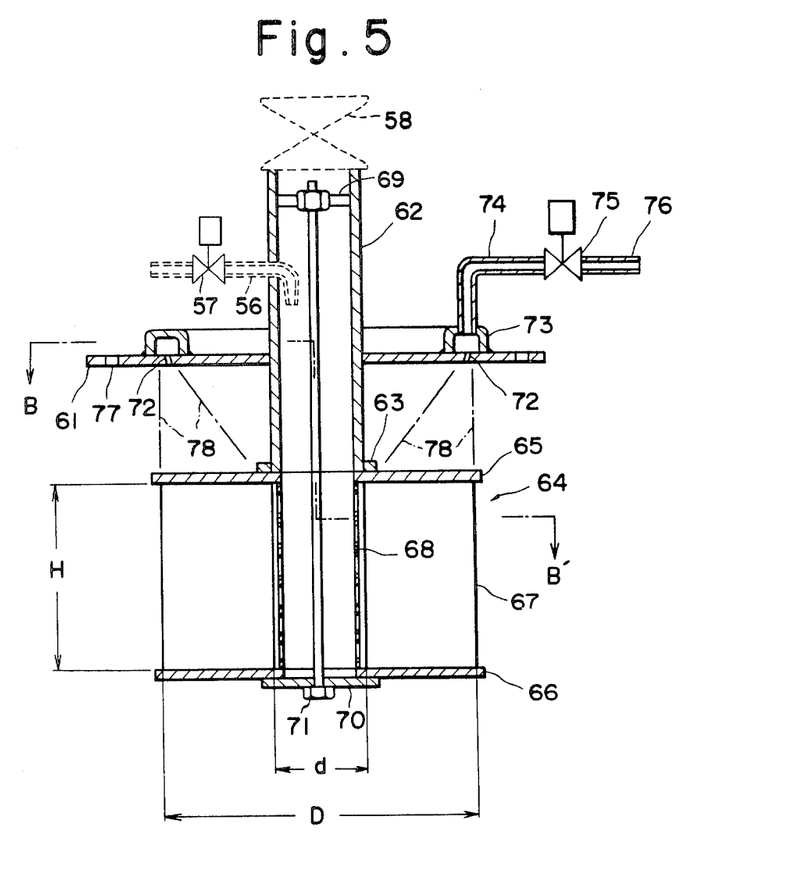
FIGS. 5 and 6 are vertical and horizontal sections, respectively, illustrating another embodiment of a filtration apparatus according to the present invention.
Figure 6:
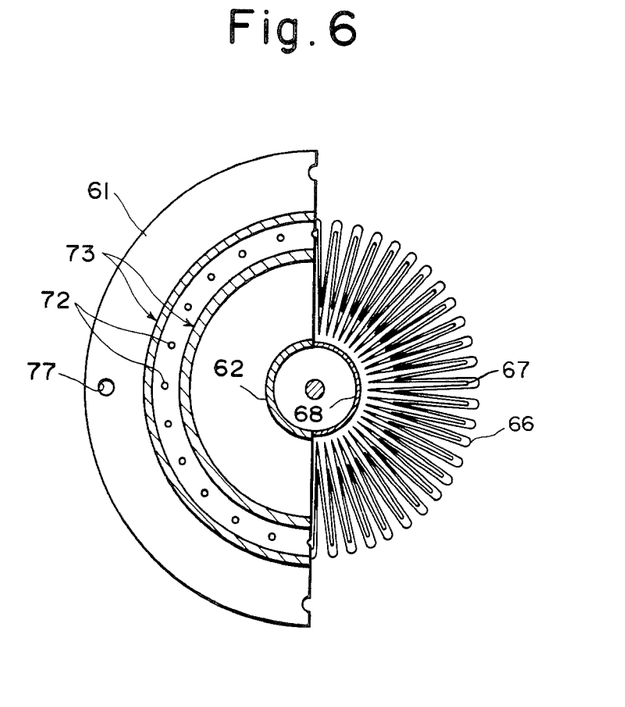

A second embodiment of the present invention is illustrated in FIGS. 5 and 6. Here the apparatus includes a base plate 61, an outlet pipe 62, a flange 63 formed integral with the outlet pipe 62 on the outer wall thereof, and a fluted or pleated filter unit 64. The filter unit 64 comprises upper and lower wheel-like support plate members 65 and 66 on the upper and lower sides thereof, respectively, a filter cloth 67 folded into a fluted configuration and connected at its circumference, and a perforated support plate 68. Numeral 69 denotes a support equipped with a nut, 70 a blind flange, and 71 a bolt. The bolt 71 fastens the blind flange 70 to the support and nut combination 69 and serves to fix the fluted filter unit 64 by pulling it against the flange 63. The base plate 61 is provided with orifices 72 and a cleaning air jetting passage 73 communicating with the orifices 72. A pipe 74 connects the passage 73 with a cleaning air inlet pipe 76 through an automatic valve 75. Numeral 77 designates a bolt hole provided in the base plate 61. The inclined lines shown at number 78 indicate the outermost boundary of the overall amplified cleaning air flow caused by the jetted air from the orifices 72, which are flared downwardly and inclined inwardly to jet the entrained air in the indicated region. The fluted filter cloth has an inner diameter d, an outer diameter D, and a height H.

In the present embodiment, the treating flow rate per filter unit also is 1.5 m³/min (25,000 cm³/sec), the same as in the first embodiment, thereby facilitating a comparison of the two. While this embodiment has almost the same function and operates in almost the same manner as the first embodiment, there are certain distinctions which will now be set forth.

(a) By adopting a fluted filter unit, the same filter cloth surface area can be obtained with a filter cloth having much smaller outside dimensions.

(b) The reduction in the size of the filter cloth portion is accompanied by a shortening in the length of the filter from the inlet portion thereof for the overall amplified cleaning air flow to the outlet portion thereof. Accordingly, cleaning may be executed without disposing a guide plate around the filter cloth and in parallel with the direction of overall amplified cleaning air flow.

(c) The filter cloth surfaces (on the primary or outer side) of the mutually adjacent fluted portions of the filter construct narrow paths which force the overall amplified air for cleaning to flow substantially parallel to the filter cloth surface along the length of the filter cloth in a predetermined direction.

In the following description, we will emphasize these factors, attributed to the filter unit configuration, that distinguish the present embodiment from the first embodiment.

The required filter cloth area of 7,500 cm² may be obtained using a rectangular filter cloth which is 15 cm wide and 500 cm long. The opposing lateral (short) edges of the filter cloth are adhered to each other to form the filter cloth into a ring, which is then folded to form 50 flutes of a width of 5 cm each at right angles to the long sides of the cloth. This provides the fluted filter cloth 67 which is shown installed in the filter unit in FIG. 6. For an ordinary fluted filter unit, the the plate members 65, 66 are disk-shaped members with cut-out portions having a round hole provided at the center thereof. The long sides (namely the upper and lower edges) of the filter cloth are affixed to the members 65, 66, whereby the primary and secondary sides of the filter cloth are completely isolated from each other and passages are formed solely by means of the filter cloth. As a result, the dimensions are, with reference to FIG. 5, inner diameter d=9.5 cm, outer diameter D=19.5 cm, height H=15 cm. It will be appreciated that a major reduction in size is achieved over the first embodiment, wherein the dimensions of the filter cloth cylinder are a diameter of 20 cm and a height of 119 cm. The area of the donut-shaped region of the outer diameter D and inner diameter d is 228 cm², half of which (114 cm²) is the cross-sectional area of the passages for the cleaning air, which passages are defined by the spaces between the flutes of the filter cloth. This is 1/68 of the filter cloth area of 7,500 cm².

The cleaning operation is similar to that practiced in the first embodiment. Specifically, by momentarily opening and then closing the automatic valve 75, pressurized air from the inlet pipe 76 passes through the pipe 74 and jetting passage 73 and is jetted from the orifices 72 in the spread pattern indicated by the lines 78, whereby the overall amplified cleaning air flow passes through the spaces between the flutes on the primary side of the filter cloth 67, thereby to clean the filter. In accordance with this cleaning operation, the filter cake is cleaned off the filter cloth fully, without the filter cake continuing to build up and harden on the flutes of the filter, as in the conventional backwashing method.

Despite the fact that the fluted filter cloth has the above-mentioned merits along with its very small size, it has not been put into practical use with the conventional backwashing method because the filter cake hardens when such method is adopted, as will now be described.

During the filtration cycle using the fluted filter cloth, a layer of the filter cake forms in the usual fashion on each of the closely opposing surfaces on the primary side of the filter cloth in the narrow spaces between the neighboring flutes. Since the spaces become particularly narrow near the core of the filter, namely at the inner peripheral portion thereof, it is here that the filter cake layers on the adjacent flute surfaces draw near to each other. From observations of a cleaning cycle using the backwashing technique, it has been found that filter cake over only a limited area is peeled off and caused to fall since the force of the backwashing air is extremely weak, as mentioned earlier. This is similar to the situation experienced with the cylindrical type filter cloth. However, one characteristic of a fluted filter unit is that the impact of the jetted backwashing air causes each of the fluted portions to inflate on the secondary side, thereby narrowing the spaces between the fluted portions on the primary side. Following the instantaneous jetting of the cleaning air, the associated valve is closed, allowing the spaces between flutes to more or less return to their original condition. As the filtering and cleaning cycles are repeated, it has been observed that the mutually adjacent filter cake surfaces on the fluted portions are compressed, compacted and unified at the narrow spaces approximate the inner peripheral portion of the filter where the filter cake is particularly difficult to peel off. In the next filtering cycle, particles are added to the portions between the filter cloth and the compressed, hardened filter cake and are themselves compressed by the action of the next backwashing cycle, until the inner peripheral portion of the filter cloth is eventually clogged with a hardened particulate mass. The filter cloth at this portion is no longer in its original condition and is urged toward the secondary side. Thenceforth, this portion of the filter obviously is completely incapable of performing filtration.

The foregoing phenomenon spreads from the inner to the outer peripheral portion of the filter cloth as the filtering and cleaning cycles progress, until even the partial filter cake peeling effect initially exhibited by the backwashing operation is lost completely. As a result, there is a very large rise in the filter cloth pressure differential and a sudden drop in the filtered air flow rate, eventually making it impossible to keep the equipment running. This may occur in as short a time as 30 minutes, depending upon the type of particulate matter involved. It is a surprising fact that the filter cake at this stage may be completely solidified up to the outer circumference of the filter cloth (i.e., up to the outer diameter D in FIG. 5), the state of solification being such that the filter cake can be made to fall away, with some difficulty, by prodding with a rod. In other words, even though the backwashing air possesses only a weak force in so far as dust removal is concerned, it does cause the development of sufficient pressure for closing the gaps between the fluted portions of the filter cloth on the primary side, thereby bringing about the foregoing phenomenon. It is surmised from observations that even the initial filter cake peeling effect is the result not of wind force but of deformation sustained by the fluted portions. Regardless of efforts made to achieve technical improvements, therefore, it appears to have been quite impossible to utilize a fluted filter unit for the repeated collection of strongly adherent particles through use of the prior art arrangements.

Figure 7:
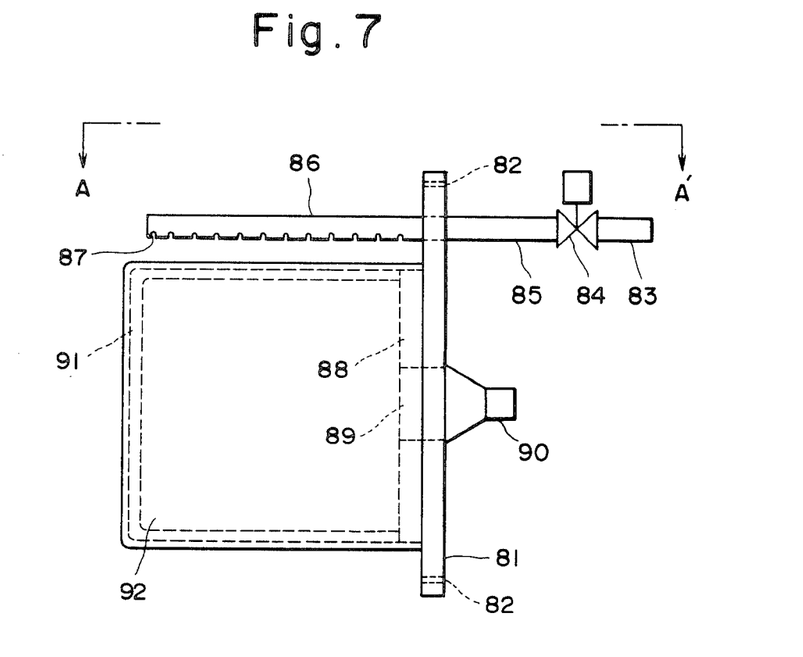
FIG. 7 is a longitudinal section illustrating a third embodiment of the present invention.
Figure 8:
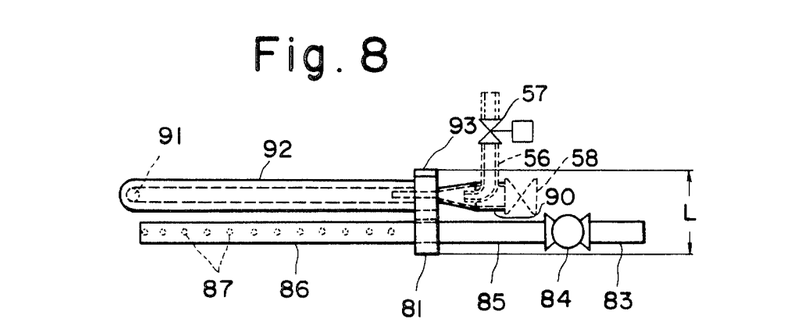
FIG. 8 is a side view as seen viewing along the arrows A—A' of FIG. 7.

A third embodiment of the present invention is shown in FIGS. 7 and 8. The apparatus includes a base plate 81 having bolt holes 82, an inlet pipe 83 connected to a pipe 85 by an automatic valve 84 for opening and closing the passage between the pipes, a pipe 86 for jetting cleaning air communicating with the pipe 85 and having a number of orifices 87, and a filter mounting member 88 provided on the base plate 81. Numeral 89 denotes an outlet hole, and 90 an outlet pipe communicating with the outlet hole 89. Also included are a filter cloth supporting rod 91, a filter cloth 92 and a packing 93. Character L indicates the width necessary for installing one filter unit.

The filter unit is installed on the wall of a collecting vessel (not shown) by means of the base plate 81. To this end, the collecting vessel wall is provided with a rectangular opening one side of which is somewhat shorter than the distance between the bolt holes 82, thereby allowing the bolts passed through the bolt holes 82 to engage the collecting vessel wall. The length of the sides of the opening adjacent the above-mentioned side is found by multiplying L by the number of filter units to be installed.

The filter cloth 92 has the form of a bag obtained by overlapping two rectangular filter cloths which are then stiched together along three sides. The open side of the bag-like filter cloth 92 is fit around the outer periphery of the mounting member 88 and is joined to the mounting member in such fashion as to maintain a hermetic seal. The remaining three sides of the filter cloth 92 are held in an extended and tensioned state by the filter cloth supporting rod 91, which consists of a bent round rod supported on the base plate 81 and located within the filter cloth to be covered thereby. The filter cloth 92 supported and tensioned in this fashion has the configuration as shown in FIG. 7. The outlet hole 89 is provided in the central portion of the filter cloth mounting member 88, whereby the outlet pipe 90 is brought into communication with the interior of the filter cloth bag, whose inner side serves as the secondary side.

Since the filter units are arranged side-by-side with the filter cloth bags being spaced apart by L, the flat filter cloth surfaces of the filter units are held close together and in parallel, whereby a cleaning air passage of a small crosssectional area is formed between adjacent ones of the flat filter surfaces. The overall amplified cleaning air flow, formed by the air jetted from the orifices 87 and the entrained peripheral air existing in the collecting vessel, passes through these passages at high speed and exits from the opposite side thereof, thereby cleaning the primary side of each filter cloth. Since the outermost filter units of the filter unit array will not have an adjacent filter cloth surface on one side thereof, a guide plate having the same shape as that of the filter cloths may be disposed at this location. Otherwise, the outermost filter cloths may be regarded as being non-active portions of the apparatus.

If the filter cloth is of great length as measured from the edge facing the orifices 87 to the opposite edge thereof, the effect of the overall amplified cleaning air flow can be enhanced by providing a guide plate opposite the rectangular base plates 81 for interconnecting the outermost edges of the filter cloths.

In the foregoing embodiments, the filter cloth may consist of a fabric, paper, unwoven fabric, wire mesh or the like. What is essential is that the filter member be of such type that the surface on the primary side thereof facing the open space utilize its fine porosity to collect fine particles or powders, and that the internal structure of the filter member, from the surface of its primary side to its secondary side, have passages through to the secondary side, which passages have an opening diameter substantially equal to or larger than the pore size of the primary side. Any filter member satisfying these requirements may be employed.

In terms of the attitude or direction of the surface on the primary side of the filter cloth, the possible choices are (a) vertical, (b) horizontal and facing downwardly, (c) horizontal and facing upwardly, (d) inclined and facing downwardly and (e) inclined and facing upwardly. As long as the overall cleaning air flow velocity is appropriate, any of these attitudes may be adopted as desired. The critical point is to design cleaning air flow paths which direct the filter cake toward the bottom of the collecting vessel as the filter cake is removed in conjunction with the departure of the cleaning air from the terminus of each filter cloth, and to suitably decide the positions of the orifices and the direction of the jetted air relative to the filter cloth surface. The filter cloth may be of a cylindrical, hexagonal or any other multilateral configuration. Furthermore, the object of filtration is not limited to air, for the invention may be employed for filtering gases of all kinds.

In accordance with the present invention as described and illustrated hereinabove, the overall amplified cleaning air flow is made to flow parallel to the surface of a filter cloth in a filtration apparatus for collecting fine particles from a gas containing them, which surface, on the primary or inner side of the filter cloth, develops a filter cake due to particles adhering thereto. Owing to such an arrangement, the filter cake is completely removed even if it consists of highly adherent particles, unlike the conventional method based on backwashing, where the apparatus is large in size and high in cost regardless of the fact that the cake removal effect is virtually nil or minimal at best. Moreover, since the cleaning stream is jetted at high speed, a so-called wake-flow or amplification effect is produced by the jetted stream so that, with respect to the overall quantity of cleaning gas, the amount of cleaning gas required for introduction toward the primary side from an outside source is greatly reduced. This facilitates handling remarkably, in comparison with the prior art, in so far as the discharge of gases from the system is concerned. Furthermore, since the introduction of a small quantity of cleaning gas suffices, it is possible to reduce the overall size of the system concerned with that cleaning gas introduction as well as the overall size of the filtering system.

As many apparently widely different embodiments of the present invention may be made without departing from the spirit and scope thereof, it is to be understood that the invention is not limited to the specific embodiments thereof except as defined in the appended claims.

What I claim is:

1. A method of filtering fine particles, particularly adherent particles, from gases, and cleaning a filter cloth of collected particles, the method comprising the steps of:
   (a) passing a gas containing particles to be filtered through a filter cloth in a collecting vessel from an outer side to an inner side of the filter cloth, the particles being filtered forming a filter cake on the outer side of the filter cloth; and
   (b) cleaning the filter cake formed on the outer side of the filter cloth with an overall amplified high-speed cleaning gas flow by using a gas passage formed and lying substantially parallel along the outer side of the filter cloth, the gas passage having inlet and outlet ends and having the outer side of the filter cloth as one wall thereof, the cleaning step including
      (i) momentarily jetting a pressurized high-speed cleaning gas toward the inlet end of the gas passage from an open space in the collecting vessel upstream of the inlet end of the gas passage;
      (ii) mixing additional gas existing at the open space in the collecting vessel upstream of the inlet end of the gas passage with the jetted cleaning gas due to the pneumatic ejector effect of the high-speed cleaning gas; and
      (iii) providing the overall amplified high-speed cleaning gas flow formed by the jetted mixed gas through the gas passage past the outer side of the filter cloth having the filter cake.

2. A method of filtering gases containing fine particles according to claim 1, in which said gas passage is limited and defined by the outer side of the filter cloth and a guide member positioned opposite to the outer side of the filter cloth.

3. A method of filtering gases containing fine particles according to claim 2, further comprising the step of controlling the pressurized cleaning gas by opening and closing an automatic open/close valve provided in a pressurized gas supply pipe communicating with a source of pressurized gas.

4. A method of filtering gases according to claim 1, wherein the flow rate of the pressurized high-speed cleaning gas to the filter cloth in the cleaning step (b) (i) is within the range of from approximately equal to about twice that of the flow rate of the filtering gas to the filter cloth in the filtering step (a).

5. An apparatus for filtering fine particles, particularly adherent particles, from gases, and cleaning a filter cloth of collected particles, the apparatus comprising:
   (a) a filter cloth having an outer side and inner side;
   (b) a collecting vessel housing having a gas inlet and a gas outlet and containing the filter cloth, the filter cloth being positioned in the housing; a guide member positioned in the housing adjacent the outer side of the filter cloth such that a gas passage is formed substantially parallel along the outer side of the filter cloth and said guide member and which has side walls and inlet and outlet ends thereto with one side wall of the gas passage defined by the outer side of the filter cloth, and wherein the gas to be filtered passes through the filter cloth from the outer side to the inner side thereof; and
   (c) pressurized cleaning gas supply means for emitting a jetted gas stream into the housing in such a manner that an overall amplified cleaning gas flow passes through the gas passage substantially parallel along the outer side of the filter cloth, wherein the pressurized cleaning gas supply means has an inlet opening into the housing at an open space upstream of and adjoining the inlet end of the gas passage for pneumatically drawing additional, existing gas inside the housing and entraining the additional gas with the jetted cleaning gas stream before the mixed gas flows through the gas passage past the outer side of the filter cloth as the overall amplified cleaning gas flow.

6. An apparatus for filtering gases containing fine particles according to claim 5, in which said pressurized gas supply means comprises a pressurized gas supply pipe communicating at one end with a source of pressurized air and at the other end with a pressurizad gas delivery pipe, and wherein said pressurized gas delivery pipe has an orifice comprising the inlet opening into the housing.

7. An apparatus for filtering gases containing fine particles according to claim 6, in which said pressurized gas supply means includes an automatic open/close valve provided in said pressurized gas supply pipe.

8. An appatatus for filtering gases containing fine particles according to claim 7, wherein said filter cloth and guide member are formed into similarly shaped columnar members, and said pressurized gas delivery pipe having said orifice is disposed in such a manner that the jetted stream from said orifice is fed into the open space at the inlet end of the gas passage limited and defined by said filter cloth and said guide member.

9. A method of filtering gases containing fine particles, particularly adherent particles, from gases, and cleaning a filter cloth of collected particles, the method comprising the steps of:
   (a) passing a gas containing particles to be filtered through a filter cloth in a collecting vessel from an outer side to an inner side of the filter cloth, the particles being filtered forming a filter cake on the outer side of the filter cloth; and (b) cleaning the filter cake formed on the outer side of the filter cloth with an overall amplified high-speed cleaning gas flow by using a gas passage formed and lying substantially parallel along the outer side of the filter cloth, the gas passage having inlet and outlet ends and having the outer side of the filter cloth as one wall thereof and with a backwashing gas flow, the cleaning step including (i) momentarily jetting a pressurized high-speed cleaning gas toward the inlet end of the gas passage from an open space in the collecting vessel upstream of the inlet end of the gas passage;

(ii) mixing additional gas prevailing at the open space in the collecting vessel upstream of the inlet end of the gas passage with the jetted cleaning gas due to the pneumatic ejector effect of the high-speed cleaning gas;

(iii) providing the overall amplified high-speed cleaning gas flow formed by the jetted mixed gas through the gas passage past the outer side of the filter cloth having the filter cake; and (iv) concurrently with cleaning step (iii) hereof, momentarily jetting a backwash pressurized gas toward the inner side of the filter cloth.

10. A method of filtering gases containing fine particles according to claim 9, in which the pressurized gas on the inner side of said filter cloth is jetted from a backwashing gas orifice.

11. A method of filtering gases according to claim 9, wherein the flow rate of the pressurized high-speed cleaning gas to the filter cloth in the cleaning step (b) (i) is within the range of from approximately equal to about twice that of the flow rate of the filtering gas to the filter cloth in the filtering step (a).

12. An apparatus for filtering fine particles, particularly adherent particles, from gases, and cleaning a filter cloth of collected particles, the apparatus comprising:

(a) a filter cloth having an outer side and inner side;

(b) a collecting vessel housing having a gas inlet and a gas outlet and containing the filter cloth, the filter cloth being positioned in the housing, a guide member positioned in the housing adjacent the outer said of the filter cloth such that a gas passage is formed substantially parallel along the outer side of the filter cloth and said guide member and which has side walls and inlet and outlet ends thereto with one side wall of the gas passage defined by the outer side of the filter cloth, and wherein the gas to be filtered passes through the filter cloth from the outer side to the inner side thereof;

(c) pressurized cleaning gas supply means for emitting a jetted gas stream into the housing in such a manner that an overall amplified cleaning gas flow passes through the gas passage substantially parallel along the outer side of the filter cloth, wherein the pressurized cleaning gas supply means has an inlet opening into the housing at an open space upstream of and adjoining the inlet end of the gas passage for pneumatically drawing additional, existing gas inside the housing and entraining the additional gas with the jetted cleaning gas stream before the mixed gas flows through the gas passage past the outerside of the filter cloth as the overall amplified cleaning gas; and (d) means for jetting a pressurized gas toward the inner side of the filter cloth simultaneously with the emitting of the jetted gas stream from the pressurized cleaning gas supply means.

13. An apparatus for filtering fine particles, particularly adherent particles, from gases, and cleaning a filter cloth of collected particles, the apparatus comprising:

(a) a fluted filter cloth having gaps between the mutually adjacent portions of the fluted filter cloth to form outer sides and inner sides;

(b) a collecting vessel housing having a gas inlet and a gas outlet and containing the fluted filter cloth, the fluted filter cloth being positioned in the housing, wherein the gaps formed between the mutually adjacent portions of the fluted filter cloth define gas passages lying substantially parallel along the outer sides of the fluted filter cloth and having inlet and outlet ends, and wherein the gas to be filtered passes through the fluted filter cloth from the outer sides of the inner sides thereof; and (c) pressurized cleaning gas supply means for emitting a jetted gas stream into the housing in such a manner that an overall amplified cleaning gas flow passes through the gas passages formed by the gaps of the fluted filter cloth substantially parallel along the outer sides of the fluted filter cloth, wherein the pressurized cleaning gas supply means has an inlet opening into the housing at an open space upstream of and adjoining the inlet ends of the gas passages for pneumatically drawing additional, existing gas inside the housing and entraining the additional gas with the jetted cleaning gas stream before the mixed gas flows through the gas passages past the outer sides of the fluted filter cloth as the overall amplified cleaning gas flow.

14. An apparatus for filtering gases containing fine particles according to claim 13, further comprising a plate-like support member positioned and arranged with respect to the filter cloth so as to support the fluted filter cloth and to spread the fluted portions of said filter cloth at least on the inlet end thereof.

15. An apparatus for filtering gases containing fine particles according to claim 13, further comprising means for jetting a pressurized gas toward the inner sides of the fluted filter cloth simultaneously with the emitting of the jetted gas stream from the pressurized cleaning gas supply means.

16. An apparatus for filtering fine particles, particularly adherent particles, from gases, and cleaning a filter cloth of collected particles, the apparatus comprising:

(a) a plurality of filter units, each filter unit having two substantially flat surfaces at least one of which is formed of a filter cloth with an outer side and an inner side, said filter units being arranged side-by-side with mutually adjacent flat surfaces disposed substantially in parallel with a gap formed therebetween;

(b) a collecting vessel housing having a gas inlet and a gas outlet and containing the filter units, the filter units being positioned in the housing, wherein the gaps formed between the flat surfaces of the filter units define gas passages lying substantially parallel along the outer sides of the filter cloth and having inlet and outlet ends, and wherein the gas to be filtered passes through the filter cloths from the outer sides to the inner sides thereof; and (c) pressurized cleaning gas supply means for emitting a jetted gas stream into the housing in such a manner that an overall amplified cleaning gas flow passes through the gas passages formed by the gaps of the filter units substantially parallel along the outer sides of the filter cloths, wherein the pressurized cleaning gas supply means has an inlet opening into the housing at an open space upstream of and adjoining the inlet ends of the gas passages for pneumatically drawing aditional, existing gas inside the housing and entraining the additional gas with the jetted cleaning gas stream before the mixed gas flows through the gas passage past the outer sides of the filter cloths as the overall amplified cleaning gas flow.

17. An apparatus for filtering gases containing fine particles according to claim 16, further comprising means for jetting a pressurized gas toward the inner sides of the filter cloths of each of the filter units simultaneously with the emitting of the jetted gas stream from the pressurized cleaning gas supply means.

* * * * *

UNITED STATES PATENT AND TRADEMARK OFFICE
CERTIFICATE OF CORRECTION

PATENT NO. : 4,486,201

DATED : Dec. 4, 1984

INVENTOR(S) : Noguchi

It is certified that error appears in the above-identified patent and that said Letters Patent is hereby corrected as shown below:

```
Column 4, line 63, after "orifice" insert --,--.
Column 9, line 28, delete ",";
         line 66, "amlification" should be --amplification--.
Column 12, line 4, "value" should be --valve--.
Column 14, line 6, delete "the" (first occurrence).
Column 15, line 27, "solification" should be --solidification--.
Column 16, line 19, "crosssectional" should be
    --cross-sectional--.
Column 18, line 19, ";" should be --,--.
Column 21, line 8, "aditional" should be --additional--.
```

Signed and Sealed this

Twenty-eighth Day of May 1985

[SEAL]

Attest:

DONALD J. QUIGG

Attesting Officer    Acting Commissioner of Patents and Trademarks